United States Patent Office 3,085,885
Patented Apr. 16, 1963

3,085,885
HALOGENATED BICYCLOHEPTANE DERIVATIVES
John R. Caldwell, Kingsport, Tenn., assignor to Eastman Kodak Company, Rochester, N.Y., a corporation of New Jersey
No Drawing. Filed Mar. 21, 1960, Ser. No. 16,198
9 Claims. (Cl. 106—15)

This invention relates to halogenated bicycloheptane derivatives, and more particularly to those derivatives having the following general structural formula:

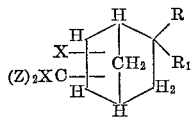

wherein R represents a hydrogen atom or a straight or branched chain alkyl group of from 1–4 carbon atoms, e.g. methyl, ethyl, propyl, isopropyl, n-butyl, sec. butyl, etc. groups, $R_1$ represents a —$OCOR_2$, a —$COOR_2$ group or a —$CONRR_2$ group wherein in each instance $R_2$ represents a straight or branched alkyl group of from 1–4 carbon atoms, a cycloalkyl group such as cyclohexyl, etc. or an aryl group such as phenyl or tolyl, X represents a halogen atom such as chlorine or bromine and Z represents hydrogen and halogen atoms.

The above defined compounds of the invention are characterized by having unusually high stability toward hydrolytic decomposition and are particularly valuable as fire-retardant plasticizers for a wide variety of plastic materials such as cellulose esters, e.g. cellulose acetate, cellulose propionate, cellulose acetate-butyrate, etc., cellulose ethers such as methyl or ethyl celluloses, vinyl polymers, e.g. polyvinyl esters of saturated monobasic fatty acids containing from 2–4 carbon atoms such as polyvinyl acetate, polyvinylbutyrate, etc., polystyrene, polyalkylacrylates and methacrylates wherein the alkyl groups contain from 1–4 carbon atoms, polyesters of glycols and dibasic acids containing from 4–12 carbon atoms such as polymethylene adipates, sebacates, terephthalates, etc. The compounds are also useful as non-flammable hydraulic fluids, lubricants and lubricating oil additives. They are soluble in common volatile solvents including aromatic and aliphatic hydrocarbons, halogenated aromatic and aliphatic hydrocarbons, esters, alcohols, ethers and ketones.

As indicated above, an important property of the new compounds is their fire-retardant action. Molded objects, sheets and films of plastic materials that contain 15 to 60% of the halogenated bicycloheptane derivatives have a greatly reduced burning rate or, in many cases, are self-extinguishing. The new compounds are also of value as constituents of paints, lacquers, varnishes and other types of protective coatings for use where resistance to burning is important. Certain metal oxides, e.g. antimony oxide increases the fire-retardant action of the compounds. Another very important property of the new halogen compounds is their resistance to hydrolysis. Since they are aliphatic halogen compounds, it would be expected that they should be unstable toward hydrolysis, in accordance with the teaching of the prior art. For example, it is stated in Ann., 302, 9 (1898), that chlorocyclohexane is stable when pure and dry, but decomposes and turns yellow when exposed to moisture. It is therefore, very surprising to find that the present compounds, even though they are endomethylenecyclohexane derivatives, are very stable toward hydrolysis. For example, the compounds of this invention are stable in the presence of water and hence can be exposed to moist atmospheres with no danger of decomposition.

It is, accordingly, an object of the invention to provide a new class of valuable halogenated bicyclopentane derivatives that are fire-retardant and have high stability toward hydrolytic decomposition. Another object is to provide compositions of plastic materials containing a substantial proportion of one or more of the compounds of the invention. Another object is to provide non-flammable hydraulic fluids and lubricating oil compositions comprising the compounds of the invention. Another object is to provide a process for preparing the above compounds and compositions. Other objects will become apparent hereinafter.

In accordance with the invention, I prepare the defined compounds of our invention by reacting bicycloheptene derivatives containing carboxyl, ester or amide groups with chlorine or bromine but preferably with halogenated methanes having the general formula $CX_2(Z)_2$ in the presence of free radical catalysts, e.g. organic peroxides such as benzoyl peroxide, acetyl peroxide, lauryl peroxide, oleoyl peroxide, triacetone peroxide, urea peroxide, t-butyl hydroperoxide, alkyl percarbonates, etc., or actinic light such as ultraviolet to introduce a halogen and a halomethyl group in the nucleus. The location of the halogen is not definitely known because rearrangement often takes place during such addition and the halogen may therefore be on the 5, 6 or 7 position of the nucleus; however, most of the facts obtained indicate that the halogen is on the 5 or 6 positions. Accordingly, the products of the above reactions are essentially mixtures of the 5 and 6 position isomers. The reaction is illustrated by the following general scheme:

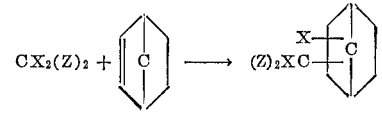

The other functional groups and the hydrogen atoms are omitted from the above structures in the interest of clarity. The proportions of the reactants can vary widely, but preferably from 1–5 moles of the halogen or the halogenated methane per mole of the cycloheptene derivative is employed. The temperature of the reaction is maintained at about from 40–200° C., but preferably at the refluxing temperatures of the reaction mixtures. The pressure is advantageously atmospheric, although higher or lower pressures can be used, if desired. Suitable halogenated methane derivatives include carbon tetrachloride, carbon tetrabromide, chloroform, bromoform, bromotrichloromethane, tribromochloromethane, dibromodichloromethane, dibromochloromethane, bromodichloromethane, bromochloromethane, methylene chloride and methylene bromide.

The following examples will serve further to illustrate the new class of compounds and the manner of preparing and using the same.

*Example 1*

231 g. (approx. 1.5 mole) of carbon tetrachloride and 76 g. (0.5 mole) of bicyclo(2,2,1)-hept-5-ene-2-yl-acetate were placed in a flask equipped with a reflux condenser. Then 1.5 g. of benzoyl peroxide were added and the solution was heated to boiling. Additional benzoyl peroxide was added in 1.5 g. portions at intervals of 1–2 hours until 4.5 g. had been added. After a total reaction time of about 6 hours, the product was distilled. The excess carbon tetrachloride was distilled at atmospheric pressure and the product was distilled at 133–140° C./0.2 mm. It weighed 125 g. representing a yield of 81.5% essentially a mixture of the isomeric of 6-chloro-5-trichloromethyl-2-norcamphanyl and 5-chloro-6-trichloromethyl-2-norcamphanyl acetates having the general structure:

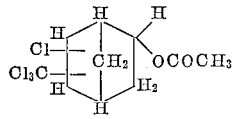

The above product was compatible with cellulose esters and cellulose ethers giving clear and smooth dopes in acetone. It was also found to be compatible with polymethyl methacrylate, polystyrene, polyvinyl acetate and various alkyd resins. The acetyl group can be removed, if desired, to form the corresponding hydroxyl compounds which may then be esterified with dicarboxylic acids, e.g. with adipic, sebacic, terephthalic, etc. acids.

*Example 2*

76 g. (0.5 mole) of bicyclo(2,2,1)hept-5-ene-2-yl acetate and 200 g. (1.0 mole) of bromotrichloromethane were placed in a glass flask and irradiated with an electric lamp.

The temperature in the flask varied from 30–42° C. during the 8 hours of irradiation. The mixture was then vacuum distilled to remove the excess of bromotrichloromethane and the residual product was then distilled at 143° C./1.2 mm. A yield of 158 g. representing 90% was obtained of essentially a mixture of the isomeric 6-bromo-5-trichloromethyl-2-norcamphanyl and 5-bromo-6-trichloromethyl-2-camphanyl acetates. This product was compatible with cellulose acetate, cellulose acetate propionate and cellulose acetate butyrate. A cellulose acetate film containing 15% by weight of the compound, which was coated from an acetone solution, was self-extinguishing. The compound was also compatible with cellulose ethers and ethyl and benzyl celluloses containing 20–25% by weight of the compound were likewise self-extinguishing. When cellulose acetate butyrate (100 parts by weight) was milled on the hot rolls with 35 parts by weight of the compound, a self-extinguishing plastic was obtained.

*Example 3*

Bicyclo(2,2,1)5 - heptene-2-methyl-2-carboxylic methyl ester was treated with carbon tetrachloride and benzoyl peroxide as described in Example 1 to give a product consisting essentially of a mixture of the isomeric 5-chloro-6-trichloromethyl-2-methyl - 2 - norcamphanylcarboxylic acid and 6-chloro-5-trichloromethyl - 2-norcamphanylcarboxylic acid methyl esters. This product was compatible with various cellulose esters serving as a fire-retardant plasticizer. It was also useful as a hydraulic fluid.

Other compounds and isomeric mixtures coming within the invention can be prepared by the example procedures set forth in the above, for example, the corresponding mixtures of the isomeric propionates and butyrates can be obtained by replacing the starting bicycloheptene derivatives of the above examples with bicyclo(2,2,1)hept-5-ene-2-yl propionate, butyrate, amide, N-alkyl and N,N-dialkyl amides. Such products have generally similar properties and utilities as those described in the above examples.

What I claim is:

1. A compound selected from the group consisting essentially of those compounds represented by the following general formulas:

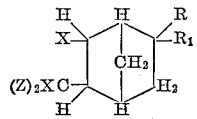

and

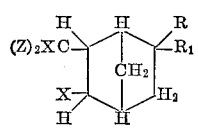

wherein in each instance R represents a member selected from the group consisting of a hydrogen atom and an alkyl group of from 1–4 carbon atoms, $R_1$ represents a member selected from the group consisting of a —$OCOR_2$ group and a —$COOR_2$ group wherein $R_2$ represents a member selected from the group consisting of an alkyl group of from 1–4 carbon atoms, a cyclohexyl group, a phenyl group and a tolyl group, X represents a member selected from the group consisting of chlorine and bromine, and Z represents a member selected from the group consisting of a hydrogen atom, chlorine and bromine.

2. A process for preparing a compound selected from the group consisting essentially of those compounds represented by the following general formulas:

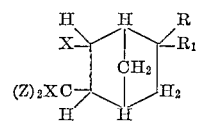

and

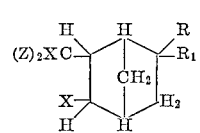

wherein in each instance R represents a member selected from the group consisting of a hydrogen atom and an alkyl group of from 1–4 carbon atoms, $R_1$ represents a member selected from the group consisting of a —$OCOR_2$ group and a —$COOR_2$ group wherein $R_2$ represents a member selected from the group consisting of an alkyl group of from 1–4 carbon atoms, a cyclohexyl group, a phenyl group and a tolyl group, X represents a member selected from the group consisting of chlorine and bromine, and Z represents a member selected from the group consisting of a hydrogen atom, chlorine and bromine, which comprises reacting a cycloheptene derivative having the general formula:

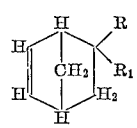

wherein R and $R_1$ are as above defined, with a halogenated methane having the general formula:

$$CX_2(Z)_2$$

wherein X and Z are as above defined, at from about 40–200° C. in the presence of an organic peroxide catalyst in the proportions of from 1–5 moles of the said halogenated methane to each mole of the said bicycloheptene derivative.

3. A compound as described in claim 1 wherein the substituents R, $R_1$, X and $CX(Z)_2$ are hydrogen, acetoxy, chlorine and trichloromethyl, respectively.

4. A compound as described in claim 1 wherein the substituents R, $R_1$, X and $CX(Z)_2$ are hydrogen, acetoxy, bromine and trichloromethyl, respectively.

5. A compound as described in claim 1 wherein the substituents R, $R_1$, X and $CX(Z)_2$ are methyl, carbomethoxy, chlorine and trichloromethyl, respectively.

6. The process of claim 2 wherein the said cycloheptane derivative is bicyclo(2,2,1)hept-5-ene-2-yl acetate and the said halogenated methane is carbon tetrachloride.

7. The process of claim 2 wherein the said cycloheptane derivative is bicyclo(2,2,1)hept-5-ene-2-yl acetate and the said halogenated methane is bromotrichloromethane.

8. The process of claim 2 wherein the said cycloheptane derivative is bicyclo(2,2,1)5 - heptene - 2 - methyl-2-carboxylic acid methyl ester and the said halogenated methane is carbon tetrachloride.

9. A composition of matter consisting of materials selected from the group consisting of (1) a cellulose organic ester wherein the acyl groups contain 1–4 carbon atoms,
(2) a polyvinyl carboxylic ester wherein the acyl groups contain 1–4 carbon atoms,
(3) a polyalkylacrylate wherein the alkyl groups contain 1–4 carbon atoms,
(4) a polyalkylmethacrylate wherein the alkyl groups contain 1–4 carbon atoms,
(5) a polyester of an aliphatic glycol and a dibasic carboxylic acid wherein the acyl groups contain 4–12 carbon atoms, and
(6) polystyrene, and from about 15 to about 60% by weight of materials selected from the group consisting essentially of those compounds represented by the following general formulas:

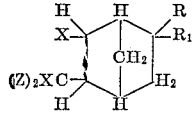

and

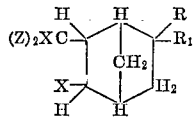

wherein in each instance R represents a member selected from the group consisting of a hydrogen atom and an alkyl group of from 1–4 carbon atoms, $R_1$ represents a member selected from the group consisting of a —$OCOR_2$ group and a —$COOR_2$ group wherein $R_2$ represents a member selected from the group consisting of an alkyl group of from 1–4 carbon atoms, a cyclohexyl group, a phenyl group and a tolyl group, X represents a member selected from the group consisting of chlorine and bromine, and Z represents a member selected from the group consisting of a hydrogen atom, chlorine and bromine.

References Cited in the file of this patent
UNITED STATES PATENTS

| | | |
|---|---|---|
| 2,569,122 | Adelson | Sept. 25, 1951 |
| 2,759,011 | Soloway | Aug. 14, 1956 |
| 2,839,553 | Soloway | June 17, 1958 |
| 2,841,484 | Johnson | July 1, 1958 |
| 2,841,485 | Johnson | July 1, 1958 |